United States Patent [19]

Estelle

[11] Patent Number: 5,650,878
[45] Date of Patent: Jul. 22, 1997

[54] COMPACT LENS SYSTEM AND A METHOD FOR MAKING SUCH

[75] Inventor: Lee R. Estelle, Rochester, N.Y.

[73] Assignee: Eastman Kodak Company, Rochester, N.Y.

[21] Appl. No.: 580,092

[22] Filed: Dec. 22, 1995

[51] Int. Cl.$^6$ .................. G02B 9/12; G02B 9/34; G02B 9/08

[52] U.S. Cl. .......... 359/784; 359/740; 359/754; 359/774; 359/771

[58] Field of Search .............. 359/740, 725, 359/771, 774, 784, 754

[56] References Cited

U.S. PATENT DOCUMENTS

| | | | |
|---|---|---|---|
| 1,540,752 | 6/1925 | Bielicke | 359/773 |
| 3,011,401 | 12/1961 | Sandback | 359/774 |
| 3,020,804 | 2/1962 | Cox et al. | 359/774 |
| 3,074,316 | 1/1963 | Cox et al. | 359/774 |
| 3,169,441 | 2/1965 | Johnson | 355/71 |
| 3,466,115 | 9/1969 | Ruben | 359/774 |
| 3,915,559 | 10/1975 | Fleischman | 359/774 |
| 4,384,766 | 5/1983 | Tokuhara | 359/732 |
| 4,521,084 | 6/1985 | Kurihara | 359/715 |
| 4,568,151 | 2/1986 | Mihara | 359/773 |
| 4,576,448 | 3/1986 | Ikari | 359/764 |
| 4,606,607 | 8/1986 | Kurihara | 359/715 |
| 5,243,468 | 9/1993 | Ohtake | 359/740 |
| 5,418,649 | 5/1995 | Igarashi | 359/784 |
| 5,436,767 | 7/1995 | Suzuki et al. | 359/784 |
| 5,572,369 | 11/1996 | Estelle et al. | 359/785 |
| 5,589,989 | 12/1996 | Estelle et al. | 359/785 |

Primary Examiner—Georgia Y. Epps
Assistant Examiner—Evelyn A. Lester
Attorney, Agent, or Firm—Svetlana Z. Short

[57] ABSTRACT

A compact lens system has a predetermined focal length and comprises a plurality of lens elements and an internal aperture stop. The lens system is asymmetrical about the aperture stop. The plurality of lens elements define a field of view of at least 10 degrees. The plurality of lens elements include a front lens element, a rear lens element and at least one lens element located between the rear and the front lens elements. The rear lens element defines a rear vertex and a rear surface clear aperture with a predetermined diameter. The front lens element defines a front vertex and a front surface clear aperture with a predetermined diameter. The front and rear vertices are spaced apart less than 20% of the lens system's focal length. The front surface clear aperture diameter is within 10% of the rear surface clear aperture diameter.

7 Claims, 2 Drawing Sheets

FULL FIELD
−87.2 mm

FIG. 2D — 0.546, 0.65, 0.45 / FY
FIG. 2E — 0.65, 0.45, 0.546 / FX 0.7 FIELD
−61 mm

ON-AXIS
0 mm

COMPACT LENS SYSTEM AND A METHOD FOR MAKING SUCH

CROSS-REFERENCE TO RELATED APPLICATIONS

This application is related to U.S. Ser. No. 08/577,027, entitled A CLUSTER LENS SYSTEM SUCH AS FOR USE IN PHOTOGRAPHIC PRINTERS, in the names of Barbara J. Kouthoofd and Lee R. Estelle; U.S. Ser. No. 08/577,022, entitled LENS SYSTEM, in the name of Barbara J. Kouthoofd; and U.S. Ser. No. 08/577,028, entitled OBJECTIVE LENS SYSTEM, in the name of Barbara J. Kouthoofd, all filed concurrently herewith on Dec. 22, 1995.

BACKGROUND OF THE INVENTION

1. Field of the Invention

The present invention relates to compact lens systems.

2. Description of the Prior Art

Compactness in a lens system is measured by the small sizes of clear aperture diameters of the lens elements and by the shortness of the front vertex to rear vertex distance. Compactness is influenced by many requirements such as the F-number, the field of view (or the field angle), focal length and relative illumination or vignetting.

The specific application for which the lens system is designed will dictate such factors as the number of the lens elements, the lens system's complexity, and the required image quality. These factors also influence the lens system's compactness. For example, it is fairly easy to design a compact 1:1 re-imager, symmetrical about an internal aperture stop. It is also fairly easy to design a compact lens system that has no appreciable field of view. It is much harder to design a non-symmetrical compact lens system for an application requiring an excellent image quality over a large field of view (i.e., a field of view of over approximately 10 degrees).

When a lens designer is required to design a non-symmetrical compact lens system with a large field of view, the designer will usually first come up with a starting point lens system design that substantially satisfies the above mentioned requirements. Then the designer will optimize (via the use of a commercial lens design program) this starting point lens design for small clear aperture diameters by targeting the heights of the upper and lower rim field rays originating from the edge of the field of view. More specifically, a lower rim field ray is used to control the front aperture diameter of the lens system and the upper rim ray is used to control the rear aperture diameter.

This method is inefficient and results in small clear aperture diameters only through trial and error. Thus there exists a need for an efficient method that results in compact lens system designs.

Non-symmetrical compact lens systems with large fields of view are useful in many applications. For example, many camera lens systems require compactness. Relatively compact camera lens systems are disclosed, for example, in U.S. Pat. Nos. 5,243,468; 4,521,084; 4,568,151; 4,576,448; and 4,606,607. However, although these lens systems have small front-vertex-to film plane distances, the lens elements' clear aperture diameters are quite large.

A cluster lens printer is a printer that simultaneously uses a plurality of lens systems to produce a plurality of images. These lens systems share a common object and a common image plane. The clear aperture diameters of such lens systems need to be small so that the individual lens systems of the cluster lens system can fit next to each other. Because of this requirement, a cluster lens printer cannot utilize lens systems such as the one disclosed in the above-mentioned patents. Other applications may also require a compact lens system with small clear aperture diameters.

Some lens systems, such as lens systems for camera objectives achieve compactness by reducing clear aperture diameters by vignetting, i.e. by cutting the field rays off. This vignetting causes the resultant images to look bright at the center and dark at the corners. Although a relatively large amount of vignetting (≈40% to −50%) can be tolerated in a camera lens, other applications cannot tolerate that much vignetting. For example, a large variation in illumination (due to vignetting) at the image is not acceptable output in a commercial quality printer. For good quality image production, only a minimum amount of vignetting (i.e., 15% and preferably much less) can be tolerated in a printer lens system.

Thus, there exists a need for compact lens systems having both a small front-to-rear vertex distance, small clear aperture diameters, and little or no vignetting.

SUMMARY OF THE INVENTION

It is an object of this invention to produce a compact lens system having both small clear aperture diameters and a small front vertex to rear vertex distance and also having minimal vignetting.

According to the invention, a compact lens system has a predetermined focal length and comprises a plurality of lens elements and an internal aperture stop. The lens system is asymmetrical about the aperture stop. The plurality of lens elements define a field of view of at least 10 degrees. The plurality of lens elements include a front lens element, a rear lens element and at least one lens element located between the rear and the front lens elements. The rear lens element defines a rear vertex and a rear surface clear aperture with a predetermined diameter. The front lens element defines a front vertex and a front surface clear aperture with a predetermined diameter. The front and rear vertices are spaced apart less than 20% of the lens system's focal length. The front surface clear aperture diameter is within 10% of the rear surface clear aperture diameter.

According to a preferred feature of the present invention, the lens system is not a 1:1 reimager.

According to another preferred feature of the present invention the lens system satisfies the following requirements:

1. $0.95 < (|PYC_f| + |PY_f|)/(|PYC_r| + |PY_r|) < 1.05$;

2. $0 < |PYC_f| \left( EF * \left( \left| \dfrac{1}{m} \right| + 1 \right) * \tan\theta \right) < 0.1$; and 3. $0 < |PYC_r|/(EF*(|m|+1)*\tan\theta) < 0.1$, where, $PYC_f$ is the height of a principal ray on a front surface of the lens system, $PY_f$ is the height of a marginal axial ray on the front surface of the lens system; $PYC_r$ is the height of the principal ray on a rear surface of the lens system, $PY_r$ is the height of the marginal axial ray on the rear surface of the lens system, EF is the lens system's focal length, $\theta$ is a full field coverage, and m is the lens system's magnification. The lens system magnification m is less than 1.0 if the object size is larger than the image size.

It is an advantage of the present invention that the lens system has minimal clear aperture diameters, yet the amount of light arriving at the corners of the field of view is maximized.

It is another advantage of the present invention that the lens system is short, i.e. that is, it has a small front vertex to rear vertex distance.

BRIEF DESCRIPTION OF THE DRAWINGS

An embodiment of the present invention will now be described, by way of example, with reference to the accompanying drawings, in which:

FIGS. 2A–2I provide aberration curves for the lens system illustrated in FIG. 1.

DESCRIPTION OF THE PREFERRED EMBODIMENT

According to the present invention, a starting point lens design satisfying the focal length, F-number and field of view requirements was obtained. Then it was determined which surface on each side of the aperture stop has the largest minimum clear aperture diameter. (A clear aperture is the surface of a lens element which is active in forming an image. A minimum clear aperture diameter defines a surface that just passes the required on axis or off axis rays.) Finally, the absolute values of sum of the principal ray's height and the axial marginal ray's height at these surfaces were targeted to be roughly equal. (If no vignetting is present, the sum of the principal ray height and the axial marginal ray height on any given surface equals to one half of the minimum clear aperture diameter of that surface). The surfaces that have the maximum clear aperture diameters are usually the exterior surfaces, i.e. the front surface and the rear surface. The principle ray (ray B) is defined as the ray in the center of the off-axis ray bundle. This ray corresponds to the maximum field angle of the lens system. The axial marginal ray (ray A) is a ray of the axial ray bundle that just passes through the lens system's aperture stop.

The resultant lens system design achieves an excellent image quality with very small clear aperture diameters and a minimal vignetting factor. The clear aperture diameters can be further minimized if some vignetting is allowed.

Figure 1:
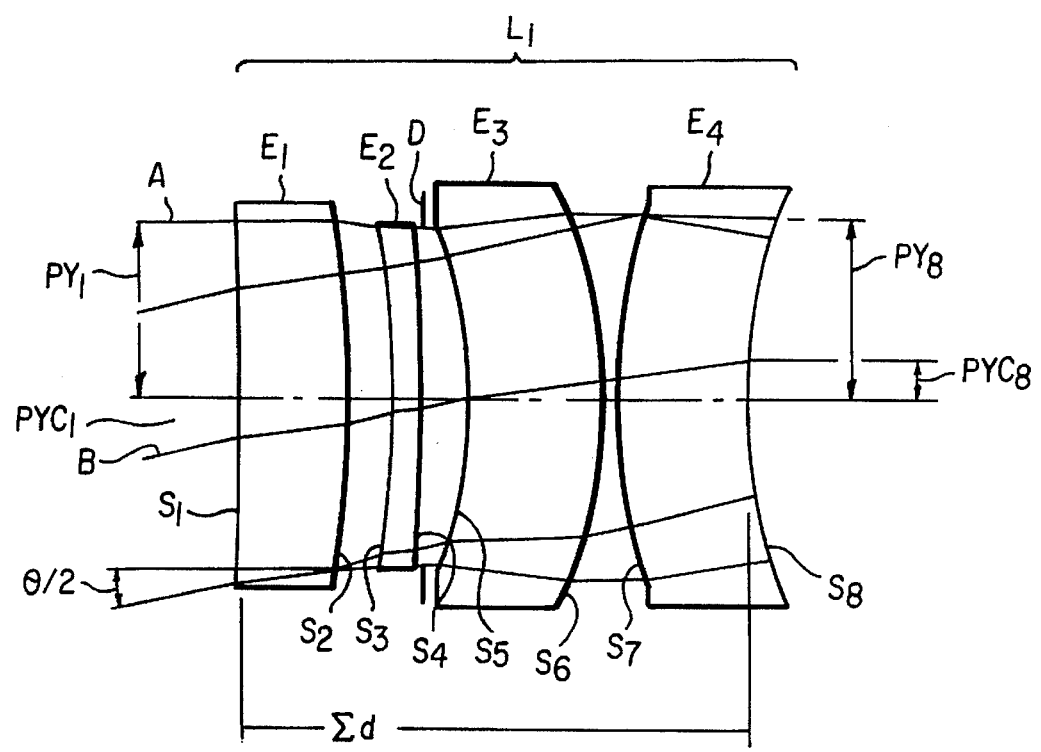
FIG. 1 is a side view schematic of a lens system according to the present invention.

FIG. 1 illustrates the compact lens system $L_1$ of the preferred embodiment of the present invention. This lens system is designed for use in a cluster lens system and thus has to be compact. The lens system $L_1$ of the preferred embodiment is required to maximize the amount of light reaching the edge of the field, thus vignetting must be less than approximately 15%. For this application, it is desirable for vignetting to be about 10% or less.

In lens system $L_1$, the surfaces that have the greatest clear aperture diameters are the front and rear surfaces $S_1$ and $S_8$. Thus, the clear aperture diameters of surfaces $S_1$ and $S_8$ were targeted to be within 10% of each other.

In order to achieve a compact lens system, the following equations need to be satisfied:

1. $0.95 < (|PYC_1|+|PY_1|)/(|PYC_8|+|PY_8|) < 1.05$;

2. $0 < |PYC_1|/\left( EF * \left( \left|\frac{1}{m}\right| + 1 \right) * \tan\theta \right) < 0.1$;

3. $0 < |PYC_8|/(EF*(|m|+1)*\tan\theta) < 0.1$; and

4. $\Sigma d \leq 0.2 * EF$, where, as shown in FIG. 1, $PYC_1$ is the ray height of the chief ray at the front surface of the lens system, $PY_1$ is the height of a marginal axial ray at the front surface of the lens system; $PYC_8$ is the ray height of the chief ray at the eighth surface of the lens system, $PY_8$ is the height of the marginal axial ray at the eighth surface of the lens system, EF is the lens system's focal length, and $\Sigma d$ is the front vertex to rear vertex distance, $\theta$ is the full field angle, based upon thin lens theory and m is the lens system's magnification. The magnification m of a lens system is less than 1 when paraxial image height is smaller than paraxial object height.

Equations 1–3 are used to ensure that the clear apertures of the lens elements are small. They also tend to produce a lens system with a small total length—i.e. with a small front-to-rear vertex distance. More particularly, equation 1 targets the ratios of absolute value of the sum of the principal ray heights and the axial marginal ray heights of the front surface (i.e. surface $S_1$) to the rear surface (i.e. surface $S_8$) to ensure that clear apertures of these surfaces are roughly equal. Equations 2 and 3 target the ratio of the principal ray heights to the image height on surfaces $S_1$ and $S_8$, respectively. The fourth equation ensures that the total length of the lens system remains small.

The lens system $L_1$ of the preferred embodiment is very compact. It has both a small total length and small clear aperture diameters. More specifically, according to the lens system $L_1$ of the present embodiment, $PYC_1 = -1.08$; $PY_1 = 6.24$; $EF = 128.95$, $PYC_8 = 1.70$; $PY_8 = 5.81$; $m = -0.529$; $\theta = 12.8°$;

where units of lengths are millimeters. Therefore:

1. $(|PYC_1|+|PY_1|)/(|PYC_8|+|PY_8|) = 0.975$,

2. $|PYC_1|/\left( EF * \left( \left|\frac{1}{m}\right| + 1 \right) * \tan\theta \right) = 0.024$, 3. $|PYC_8|/(EF*(|m|+1)*\tan\theta) = 0.037$, and 4. $\Sigma d = 0.15 \, EF$.

The lens system $L_1$ was designed oriented from long to short conjugates. The following text describes the lens in this orientation.

Its parameters are provided in Table 1. Its aberrations are provided in FIGS. 2A–2I.

This lens system $L_1$ includes four lens elements $E_1$–$E_4$ sequentially arranged from the long conjugate side to the short conjugate side. The front lens element $E_1$ is a biconvex lens element. The second lens element $E_2$ is a negative meniscus lens element with a concave surface oriented towards the negative. A diaphragm D (i.e., an aperture stop) is located behind this lens element and in front of lens element $E_3$. The third lens element $E_3$ is a meniscus lens element with a concave surface towards the print. The fourth lens element $E_4$ is a meniscus lens element with a concave surface towards the negative. In order to reduce manufacturing costs, the third and the fourth lens elements $E_3$ and $E_4$ were designed to be identical. They have the same radii of curvature, same thickness and are made from the same material. They are simply oriented differently. However, these two lens elements do not have to be identical.

The lens system $L_1$ has an effective focal length of 129 mm, maximum F-number with no vignetting F/10.5 and cover a full field angle of about 26 degrees. The front vertex to rear vertex length of lens system $L_1$ is about 18 mm, the object distance is 374 mm and the image distance is 184 mm.

Lens system's $L_1$ magnification m is 0.5 (i.e., the object is about two times larger than the image).

As stated above, the aberrations of lens system $L_1$ are provided in FIGS. 2A–2I.

Figures 2A, 2B, 2C:
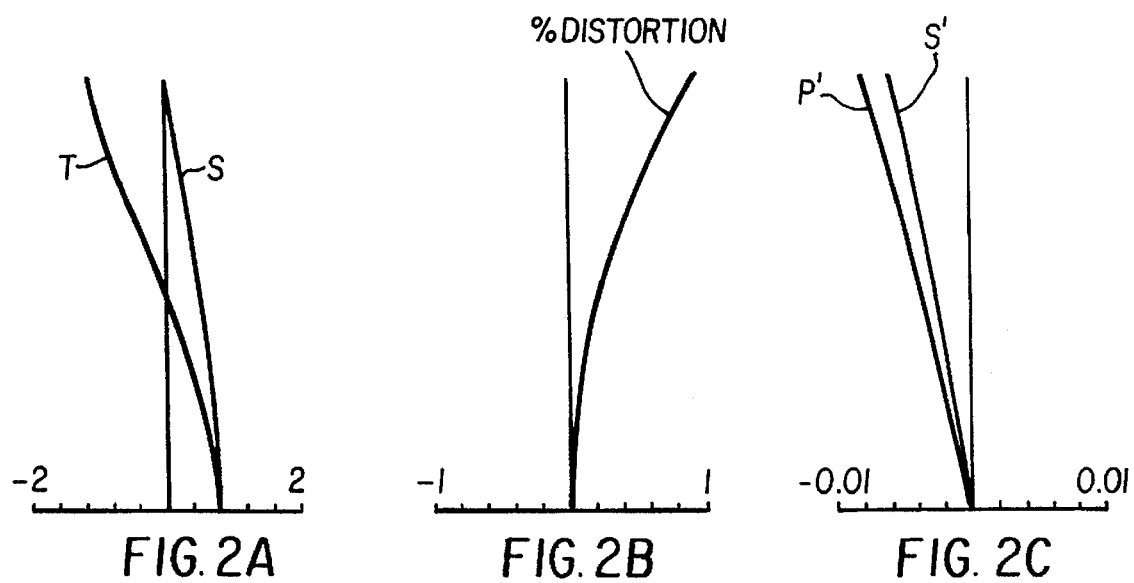

The astigmatism curves with respect to the field height in the sagittal direction S and in the tangential direction T in the focal plane (i.e., the plane of the negative) of the lens $L_1$ are shown in FIG. 2A. The percent distortion in the same plane is shown in FIG. 2B. Lateral color aberration in increments of 0.002 mm for the P' (blue minus red) and for the S' (blue minus green) chromatic characteristics are shown in FIG. 2C. In these curves, blue is 486 nm, green is 546 nm, and red is 650 nm. The rim-ray curves at maximum field coverage, 0.7 of the field and on-axis are shown in the family of curves shown in FIGS. 2D through 2I. FY is a tangential fan and FX is a sagittal fan corresponding to ray height increments $\Delta Y$ and $\Delta X$, respectively.

The following are the numerical parameters for the lens system $L_1$. The radii of curvature, air spaces, thickness of the lens elements are measured in millimeters.

| Surface | Clear Aperture | Axial Beam | Radius | Thickness | Index | V-Number |
|---|---|---|---|---|---|---|
| 1 | 13.80 | 12.48 | 346.194 | 4.163 | 1.691 | 54.7 |
| 2 | 13.16 | 12.50 | −34.7582 | 1.500 | | |
| 3 | 12.29 | 12.11 | −35.1825 | 1.000 | 1.755 | 27.6 |
| 4 | 12.18 | 12.13 | −91.8203 | 0.100 | | |
| | 12.10 | 12.10 | DIAPHRAGM | 1.678 | | |
| 5 | 12.05 | 12.05 | −17.7845 | 4.657 | 1.683 | 44.7 |
| 6 | 13.52 | 13.17 | −20.0010 | 0.599 | | |
| 7 | 13.78 | 12.99 | 20.0010 | 4.657 | 1.683 | 44.7 |
| 8 | 13.35 | 11.57 | 17.7845 | | | |
| LENS LENGTH | | | 18.354 | PTZ SUM (F/100) = 0.000411 | | |

| Image Height | Angular Field | Approx. Rel. Illum. (Image) | Max. Aper. With No. Vignetting |
|---|---|---|---|
| 15.91 | 4.56 | 0.98 | F/ 10.5 |
| 32.13 | 9.11 | 0.88 | F/ 11.4 |
| 46.11 | 12.90 | 0.77 | F/ 12.3 |

| Pupil | Location | Diameter |
|---|---|---|
| Ent. | 4.76 | 12.60 |
| Exit | −7.13 | 12.03 |

Lens $L_1$ has the smallest possible clear aperture diameters, yet the relative illumination arriving at the corners of the field of view is maximized. This requirement means that there is very little vignetting present in the lens $L_1$.

The invention has been described in detail with particular reference to a preferred embodiment thereof, but it will be understood that variations and modifications can be effected within the spirit and scope of the invention.

What is claimed is:

1. A compact lens system having a predetermined focal length, the lens system comprising:

an internal aperture stop, said lens system is being asymmetrical about said aperture stop; and a plurality of lens elements defining a field of view of at least 10 degrees, said plurality of lens elements including:

(i) a rear lens element defining a rear vertex and a rear surface clear aperture with a predetermined diameter, (ii) a front lens element defining a front vertex and a front surface clear aperture with a predetermined diameter, said front and rear vertices being spaced apart less than 20% of the lens system's focal length and said front surface clear aperture diameter being within 10% of the rear surface clear aperture diameter, and (iii) at least one lens element located between said rear and front lens elements.

2. A compact lens system having a predetermined focal length, the lens system being a non-1:1 reimager and comprising:

an internal aperture stop, said lens system is asymmetrical about said aperture stop; and a plurality of lens elements defining a field of view of at least 10 degrees, said plurality of lens elements including:

(i) a rear lens element defining a rear vertex and a rear surface clear aperture with a predetermined diameter, (ii) a front lens element defining a front vertex and a front surface clear aperture with a predetermined diameter, said front and rear vertices being spaced apart less than 20% of the lens system's focal length and said front surface clear aperture diameter being within 10% of the rear surface clear aperture diameter, and (iii) at least one lens element located between said rear and front lens elements.

3. A compact lens system having a front surface with a clear aperture diameter, a rear surface with a clear aperture diameter, and a predetermined focal length; said lens system comprising:

an internal aperture stop; and at least three lens elements and, said lens system not being a 1:1 reimager, having a field of view of at least 10 degrees, having a total front vertex to rear vertex distance less than 20% of its focal length, and having said front surface clear aperture diameter that is within 10% of said rear surface's clear aperture diameter.

4. A compact lens system according to claim 3 with no symmetry about the aperture stop.

5. A compact lens system comprising at least three lens elements and an internal aperture stop, said lens system not being symmetrical about said aperture stop, said lens system covering a field of view of at least 10 degrees and satisfying the following inequalities:

(1) $0.95 < (|PYC_f| + |PY_f|)/(|PYC_r| + |PY_r|) < 1.05;$ (2) $0 < |PYC_f| \left( EF* \left( \left| \dfrac{1}{m} \right| + 1 \right) * \tan\theta \right) < 0.1;$ and (3) $0 < |PYC_r|/(EF*(|m|+1)*\tan\theta) < 0.1,$ where $PYC_f$ is a height of a chief ray on a front surface of the lens system, $PY_f$ is a height of a marginal axial ray on the front surface of the lens system; $PYC_r$ is the height of the chief ray on a rear surface of the lens system, $PY_r$ is the height of the marginal axial ray on the rear surface of the lens system, EF is a focal length, $\theta$ is a full field angle, and m is the lens system's magnification.

6. A method of manufacturing a compact lens system comprising:

(i) obtaining a starting point design of the lens system having a front surface and a rear surface;

(ii) tracing a principal ray and an axial marginal ray through the lens system;

(iii) determining ray heights of said principal and an axial marginal rays on said front surface and on said rear surface;

(iv) adjusting design parameters to optimize the lens system so that a) a sum of the principal ray height and the chief ray height on the from surface of the lens system divided by a sum of the principal ray height and the chief ray height on the rear surface of the lens system will be about 1; and b) a front-to-rear vertex distance divided by the lens system's focal length will be less than about 0.20; and (v) producing the lens system.

7. A method of manufacturing according to claim 6, wherein the sum of the principal ray height and the chief ray height on the front surface of the lens system divided by the sum of the principal ray height and the chief ray height on the rear surface of the lens system will be between 0.9 and 1.1.

* * * * *